(12) United States Patent
Lin

(10) Patent No.: US 11,620,043 B2
(45) Date of Patent: Apr. 4, 2023

(54) COMMENT INFORMATION PROCESSING METHOD AND APPARATUS, AND STORAGE MEDIUM AND ELECTRONIC DEVICE

(71) Applicant: NETEASE (HANGZHOU) NETWORK CO., LTD., Hangzhou (CN)

(72) Inventor: Xiaolong Lin, Hangzhou (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 17/295,591

(22) PCT Filed: May 9, 2019

(86) PCT No.: PCT/CN2019/086280
§ 371 (c)(1),
(2) Date: May 20, 2021

(87) PCT Pub. No.: WO2020/124933
PCT Pub. Date: Jun. 25, 2020

(65) Prior Publication Data
US 2022/0019324 A1    Jan. 20, 2022

(30) Foreign Application Priority Data
Dec. 20, 2018    (CN) .......................... 201811565646.9

(51) Int. Cl.
*G06F 3/0488* (2022.01)
*G06F 40/14* (2020.01)
(Continued)

(52) U.S. Cl.
CPC .......... *G06F 3/0488* (2013.01); *G06F 3/0484* (2013.01); *G06F 16/284* (2019.01); *G06F 40/14* (2020.01)

(58) Field of Classification Search
None
See application file for complete search history.

(56) References Cited

U.S. PATENT DOCUMENTS

2002/0059272 A1\* 5/2002 Porter ..................... G06F 16/30
2004/0117449 A1    6/2004 Newman et al.
(Continued)

FOREIGN PATENT DOCUMENTS

CN        102117289 A  *  7/2011
CN        102117289 A      7/2011
(Continued)

OTHER PUBLICATIONS

V. Pascual-Cid and A. Kaltenbrunner, "Exploring Asynchronous Online Discussions through Hierarchical Visualisation," 2009 13th International Conference Information Visualisation, 2009, pp. 191-196, doi: 10.1109/IV.2009.14. see Abstract and at least p. 193 (Year: 2009).*

(Continued)

*Primary Examiner* — Daniel Rodriguez
*Assistant Examiner* — Gabriel Mercado
(74) *Attorney, Agent, or Firm* — Qinghong Xu

(57) ABSTRACT

A comment information processing method includes: acquiring a plurality of pieces of comment information, and generating a comment tree comprising a plurality of nodes according to an association relationship between the plurality of pieces of comment information, wherein the plurality of nodes correspond to the plurality of pieces of comment information on a one-to-one basis; generating a comment container for each target node in the plurality of nodes, the comment container being used for presenting the comment information corresponding to a parent node and immediate child nodes thereof; and changing, once a first touch event for the comment information corresponding to an immediate (Continued)

child node is detected, the immediate child node into the parent node of the comment container where the immediate child node is located, and presenting in the comment container the comment information corresponding to the changed parent node and the immediate child nodes thereof.

17 Claims, 5 Drawing Sheets

(51) Int. Cl.
*G06F 3/0484* (2022.01)
*G06F 16/28* (2019.01)

(56) References Cited

U.S. PATENT DOCUMENTS

| | | | |
|---|---|---|---|
| 2015/0052421 A1* | 2/2015 | Thomson | G06F 16/9577 715/206 |
| 2015/0220580 A1* | 8/2015 | Pitsos | G06F 16/35 707/690 |
| 2015/0229698 A1* | 8/2015 | Swan | G06Q 10/101 709/203 |
| 2016/0247535 A1* | 8/2016 | Latulipe | G11B 27/036 |
| 2017/0345127 A1 | 11/2017 | Gameros et al. | |
| 2018/0255356 A1* | 9/2018 | Zhao | G06F 3/167 |
| 2018/0337880 A1* | 11/2018 | Sokolov | H04N 21/6581 |
| 2019/0079995 A1* | 3/2019 | Jin | G06F 16/322 |

FOREIGN PATENT DOCUMENTS

| | | |
|---|---|---|
| CN | 105045899 A | 11/2015 |
| CN | 106022350 A | 10/2016 |
| CN | 106407371 A | 2/2017 |
| CN | 106503230 A | 3/2017 |
| CN | 106874574 A | 6/2017 |
| CN | 106951429 A | 7/2017 |
| CN | 109725803 A | 5/2019 |

OTHER PUBLICATIONS

The International Search Report dated Oct. 8, 2019 for PCT international application No. PCT/CN2019/086280.
The 1st Office Action dated Sep. 2, 2019 for CN patent application No. 201811565646.9.
The Notice of Allowance dated Dec. 13, 2019 for CN patent application No. 201811565646.9.

* cited by examiner

Acquiring a plurality of pieces of comment information, and generating a comment tree comprising a plurality of nodes according to an association relationship between the plurality of pieces of comment information, wherein the plurality of nodes of the comment tree correspond to the plurality of pieces of comment information on a one-to-one basis  /S310

Generating a comment container for each target node in the plurality of nodes, wherein the comment container is used for presenting the comment information corresponding to any parent node and immediate child nodes of the parent node  /S320

Changing, when a second touch event for the comment information corresponding to any immediate child node in any comment container is detected, the immediate child node on which the second touch event acts into the parent node of the comment container where the immediate child node is located, and presenting in the comment container the comment information corresponding to the changed parent node and the immediate child nodes of the changed parent node  /S330

Fig. 3

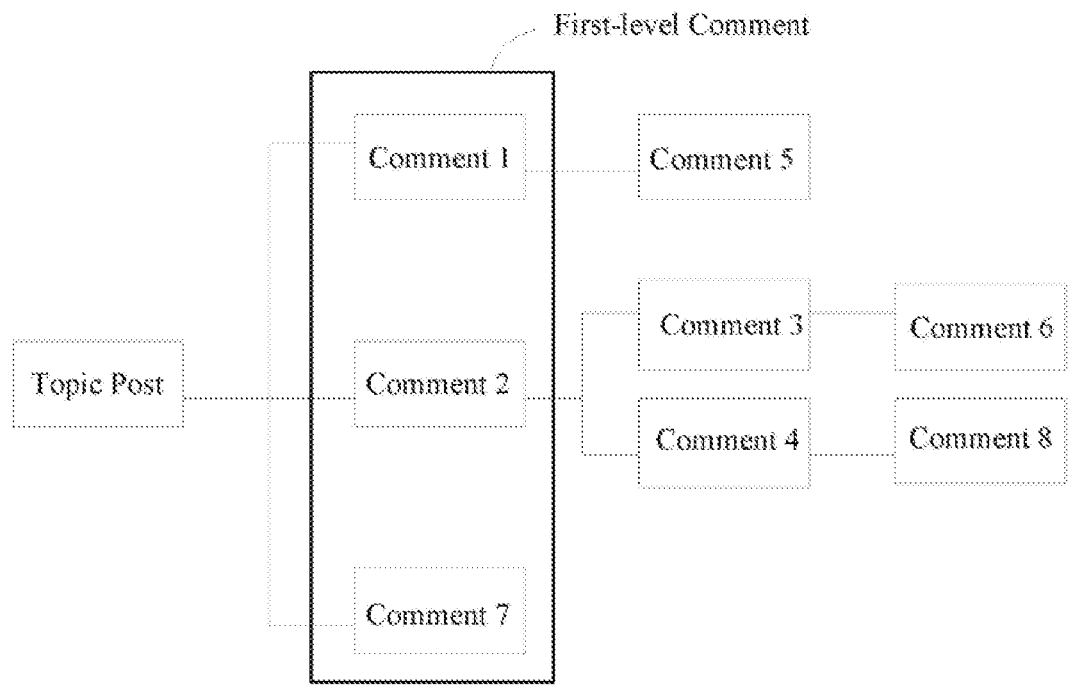

Fig. 4

COMMENT INFORMATION PROCESSING METHOD AND APPARATUS, AND STORAGE MEDIUM AND ELECTRONIC DEVICE

CROSS-REFERENCE TO RELATED APPLICATIONS

The present application is the 371 application of PCT Application No. PCT/CN2019/086280, filed on May 9, 2019, which is based on and claims the priority to the Chinese Patent Application NO. 201811565646.9, entitled "COMMENT INFORMATION PROCESSING METHOD AND APPARATUS, AND STORAGE MEDIUM AND ELECTRONIC DEVICE", filed on Dec. 20, 2018, the disclosures of both of which are hereby incorporated by reference in their entirety.

TECHNICAL FIELD

The present disclosure relates to the field of computer technologies, and in particular, to a method and device for processing comment information, a storage medium, and an electronic device.

BACKGROUND

As online communities become more and more developed, the number of comments in forums or in a comment area of news information tends to be very large. In general, every piece of comment information is presented in chronological order under a main topic, or a logical relationship of comments is indicated by displaying "quoted comments" and "current comments" when every piece of comment information is presented.

It should be noted that the information disclosed in the Background section above is only for enhancing the understanding of the background of the present disclosure, and thus may include information that does not constitute prior art known to those of ordinary skill in the art.

SUMMARY

According to an aspect of embodiments of the present disclosure, a method for processing comment information is provided, including:

acquiring a plurality of pieces of comment information, and generating a comment tree including a plurality of nodes according to an association relationship between the plurality of pieces of comment information, wherein the plurality of nodes of the comment tree correspond to the plurality of pieces of comment information on a one-to-one basis:

generating a comment container for each target node in the plurality of nodes, wherein the comment container is configured to present the comment information corresponding to any parent node and immediate child nodes thereof; and once a second touch event for comment information corresponding to any immediate child node in any comment container is detected, changing the immediate child node on which the second touch event acts into the parent node of the comment container where the immediate child node is located, and displaying the comment information corresponding to the changed parent node and the immediate child nodes thereof in the comment container.

In an exemplary embodiment of the present disclosure, after generating the comment container for each target node in the plurality of nodes, the method further includes:

displaying the comment information of the corresponding target node in each comment container; and once a first touch event that controls the comment container of any target node to be unfolded is detected, displaying the comment information of the target node and the immediate child nodes of the target node in the controlled comment container.

In an exemplary embodiment of the present disclosure, the association relationship includes a subordinate relationship between the plurality of pieces of comment information, and the generating the comment tree including the plurality of nodes according to the association relationship between the plurality of pieces of comment information includes:

determining a parent-child relationship between the plurality of nodes according to the subordinate relationship between the plurality of pieces of comment information; and generating the comment tree according to the parent-child relationship between the plurality of nodes.

In an exemplary embodiment of the present disclosure, the target nodes include first-level nodes or popular nodes.

In an exemplary embodiment of the present disclosure, the first touch event includes a tap operation acting on an arbitrary position of any comment container or a tap operation acting on an unfolding control at a preset position of any comment container.

In an exemplary embodiment of the present disclosure, the method further includes:

providing a preset area for the comment information corresponding to each immediate child node in each comment container, so as to separately present the comment information corresponding to each immediate child node of the parent node through the preset area.

In an exemplary embodiment of the present disclosure, after separately presenting the comment information corresponding to each immediate child node of the parent node through the preset area, the method further includes:

when a tap operation acting on a close control at a preset position in any comment container or a third touch event acting on a blank area other than the preset area in the comment container is detected, stopping presenting the comment information corresponding to the immediate child nodes of the parent node in the comment container.

In an exemplary embodiment of the present disclosure, the method further includes:

providing a switching control for returning to a superior node of the changed parent node at a preset position of the comment container; and once a tap operation acting on the switching control is detected, switching the comment information corresponding to the changed parent node presented in the comment container to the comment information corresponding to the superior node of the changed parent node, and switching the comment information corresponding to the changed immediate child node presented in the comment container to the comment information corresponding to the superior node of the changed immediate child node.

In an exemplary embodiment of the present disclosure, the method further includes:

providing a layout control in the comment container for switching arrangement of the comment information in the comment container.

According to an aspect of the present disclosure, a device for processing comment information is provided, including:

a comment tree generating module configured to acquire a plurality of pieces of comment information and generate a comment tree including a plurality of nodes according to an association relationship between the plurality of pieces of comment information, wherein the plurality of nodes of the comment tree correspond to the plurality of pieces of comment information on a one-to-one basis;

a comment container generating module configured to generate a comment container for each target node in the plurality of nodes, wherein the comment container is configured to present comment information corresponding to any parent node and immediate child nodes of the parent node; and a comment presenting module configured to change, once a second touch event for the comment information corresponding to any immediate child node in any comment container is detected, the immediate child node on which the second touch event acts into the parent node of the comment container where the immediate child node is located, and present the comment information corresponding to the changed parent node and the immediate child nodes of the changed parent node in the comment container.

According to an aspect of the present disclosure, there is provided a computer-readable storage medium having stored thereon a computer program which, when being executed by a processor, implements the method for processing comment information according to any of the above embodiments.

According to an aspect of the present disclosure, there is provided an electronic device, including:

a processor; and a memory for storing instructions executable by the processor, wherein the processor is configured to perform the method for processing comment information described in any of the above embodiments through execution of the executable instructions.

It should be noted that the above general description and the following detailed description are merely exemplary and explanatory and should not be construed as limiting the present disclosure.

BRIEF DESCRIPTION OF THE DRAWINGS

The drawings herein are incorporated in and constitute a part of the specification, illustrate embodiments consistent with the present disclosure, and together with the description serve to explain the principles of the present disclosure. Obviously, the drawings in the following description are only some embodiments of the present disclosure. For those of ordinary skill in the art, other drawings can be acquired based on these drawings without departing from the spirit of the present disclosure.

FIG. 3 schematically illustrates a flowchart of a method for processing comment information according to an exemplary embodiment of the present disclosure;

FIG. 4 schematically illustrates a schematic diagram of a comment tree according to an exemplary embodiment of the present disclosure;

DETAILED DESCRIPTION

Figure 1:
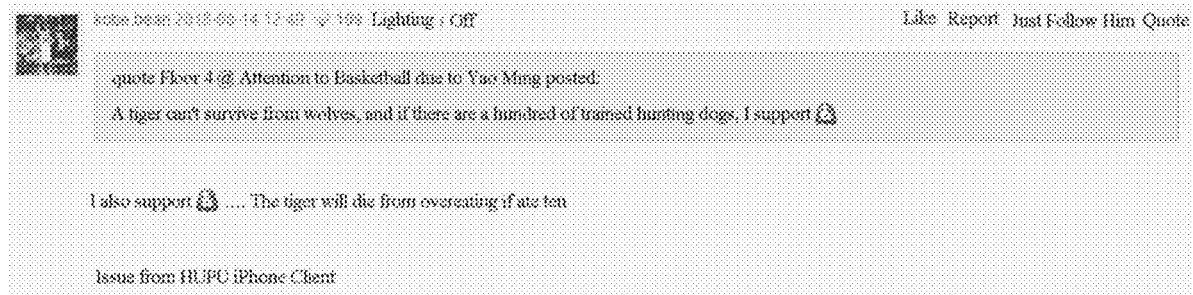
FIG. 1 schematically illustrates a schematic diagram of an operation interface for presenting comment information in the related art.

Example embodiments will now be described more fully with reference to the accompanying drawings. However, the exemplary embodiments can be implemented in various forms and should not be construed as limited to the examples set forth herein; rather, these embodiments are provided to make the present disclosure more comprehensive and complete, and to convey the concepts of the exemplary embodiments comprehensively to those skilled in the art. The described features, structures, or characteristics may be combined in any suitable manner in one or more embodiments. In the following description, numerous specific details are provided to allow a full understanding of the embodiments of the present disclosure. However, those skilled in the art will realize that the technical solutions of the present disclosure may be practiced by omitting one or more of the specific details, or by other methods, components, devices, steps, and so on. In other cases, well-known technical solutions are not shown or described in detail to avoid obscuring aspects of the present disclosure.

In addition, the drawings are merely schematic illustrations of the present disclosure and are not necessarily drawn to scale. The same reference numerals in the drawings represent the same or similar parts, and thus repeated descriptions thereof will be omitted. Some of block diagrams shown in the drawings are functional entities and do not necessarily correspond to physically or logically independent entities. These functional entities may be implemented in the form of software, implemented in one or more hardware modules or integrated circuits, or implemented in different networks and/or processor devices and/or microcontroller devices.

Figure 2:
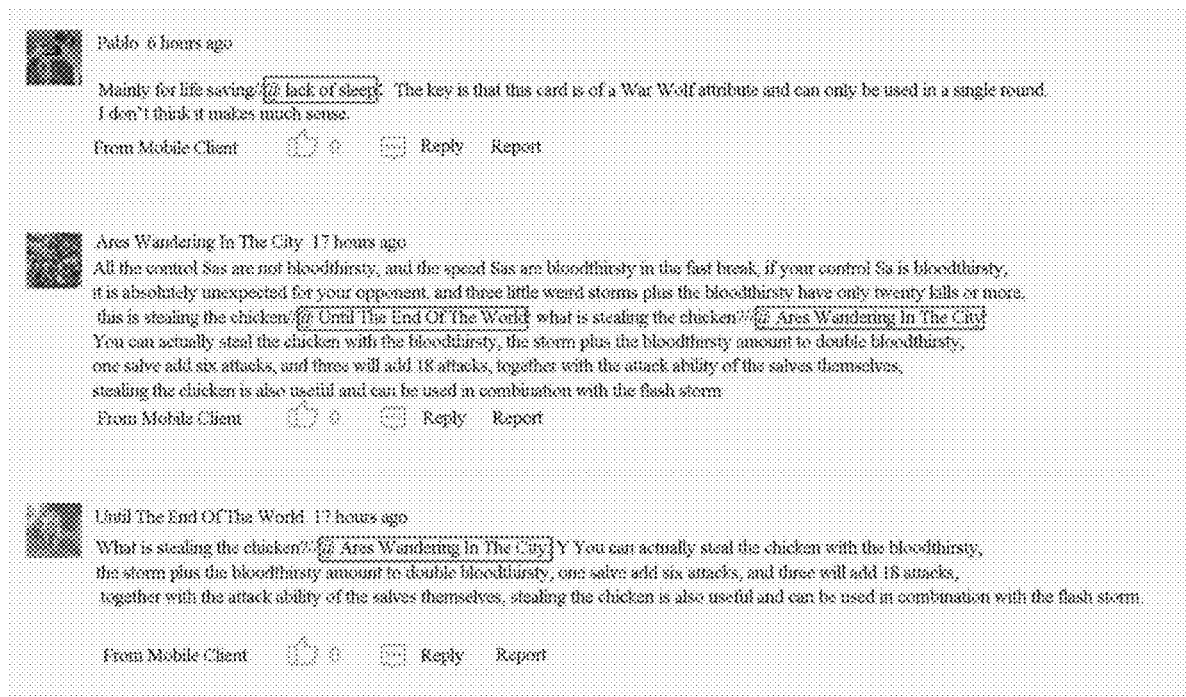
FIG. 2 schematically illustrates a schematic diagram of another operation interface for presenting comment information in the related art.

In the related art, referring to FIG. 1, a logical relationship of comments is indicated by displaying "quoted comments" and "current comments". In this way, due to pagination or scroll loading, a quotation or reply to a certain comment may be found after several pages or even dozens of pages, which lacks continuity, and subsequent replies to this comment cannot directly be seen and can only be found by viewing the comments one by one. If a comment B reviews a comment A, a comment C reviews the comment B. and the current interface is positioned at the comment C, it can only be seen that the comment C quotes the comment B, but the comment A cannot be seen, and you need to go back and look for it. Sometimes, too extreme comments are made, leading to a lot of arguments irrelevant of the topic, which may easily lead to a situation of "irrelevant floors". Referring to FIG. 2, only the first-level comments are displayed by default. By tapping a reply button of the first-level comment, all related comments under the comment can be viewed. In this way, each comment on others will bring all the previous quotations, causing a very confusing visual effect, and if the number of the comments is very large, it will take up a lot of space.

In such way of commenting, a quotation or reply to a certain comment may be found after several pages or even dozens of pages. As a result, the user cannot directly see the replies to a certain comment and the comments quoted by the certain comment, and can only search the large number of comments one by one, which leads to a low efficiency and lack of continuity in viewing the comments. In addition, since the quotation relationship is complicated, everyone replies to the comment with all previously quoted comments and the comments irrelevant to the information may be included, the displayed comments are chaotic, which results in that the user cannot quickly and accurately see the comments related to the information or quickly screen the comment, thereby affecting the accuracy for the user to obtain the effective comments.

In order to solve the above problems, embodiments of the present disclosure first provide a method for processing comment information, which can be used in a scenario for displaying comment information for information with a comment function in all fields. Next, the method for processing comment information in this exemplary embodiment will be described in detail with reference to FIG. 3.

In step S310, a plurality of pieces of comment information are acquired, and a comment tree including a plurality of nodes is generated according to an association relationship between the plurality of pieces of comment information. The plurality of nodes of the comment tree correspond to the plurality of pieces of comment information on a one-to-one basis.

In this exemplary embodiment, the comment information refers to a comment to information in various application scenarios. The application scenario may include, for example, an e-commerce scenario, an Internet scenario, a game scenario, or the like. The information may include, for example, news, pictures, products, posts, statements posted by the user on social platforms, or the like. The comment information can include Chinese, English, emoticons, links, and so on.

There may be an association relationship between the plurality of pieces of comment information. The association relationship herein includes a subordinate relationship, that is, a quoting-quoted relationship. For example, if a comment B is a reply or comment to a comment A, the comment B may be considered as a subordinate to the comment A. After determining the association relationship between the plurality of pieces of comment information, the comment tree can be generated according to the determined association relationship. Each of nodes on the comment tree is used for representing a piece of comment information. Therefore, the comment tree may include the same number of nodes as that of the pieces of comment information. The comment tree is a data structure for describing the association relationship between all the comment information in a piece of information.

Specifically, a parent-child relationship between a plurality of nodes representing the plurality of pieces of comment information may be determined according to the subordinate relationship between the plurality of pieces of comment information to generate the comment tree. Herein, the plurality of nodes of the comment tree correspond to the plurality of pieces of comment information on a one-to-one basis, and each node represents a piece of comment information. For example, if a comment B is a reply or comment to a comment A, the comment B may be considered as a subordinate to the comment A, and in this case, the node of the comment A can also be considered as a parent node, and the node of the comment B is a child node of the node of the comment A. Similarly, the parent-child relationship between all the nodes can be determined, and then the comment tree can be generated according to the parent-child relationship, as shown in FIG. 4. Referring to FIG. 4, the comment information for a topic post includes comments 1 to 8 and numbers of the comment information are determined in chronological order according to the time when the comment information is generated. Comment 1, comment 2 and comment 7 are first-level comments which may include comment information for directly commenting on the topic post. Comment 5 is subordinate to comment 1, comment 3 and comment 4 are subordinate to comment 2, comment 6 is subordinate to comment 3 and comment 8 is subordinate to comment 4. According to the subordinate relationship between the comment information, the parent-child relationship between the nodes representing the comment information can be determined, and then the comment tree as shown in FIG. 4 is generated. It should be noted that a root node of the comment tree is the topic post, the information being commented, or the like.

In step S320, a comment container is generated for each target node in the plurality of nodes, respectively, where the comment container is used for presenting the comment information corresponding to any parent node and immediate child nodes of the parent node.

In this exemplary embodiment, the target node may include, for example, the first-level nodes, and may also include popular nodes for which the number of likes meets a preset number. The preset number may be set according to actual requirements, such as 50, 80, or the like. The popular comments are not limited to the first-level comments, but can also be a sub-comment which replies to another comment and for which the number of likes meet the preset number. The comment container refers to an independent container configured to store comment information of the parent node and all the child nodes of the parent node, and can also be understood as a tappable area for storing comment information. The comment container can be generated in any area below the topic post, and one comment container is generated for each target node. The comment container in this example can also take the form of a comment card. In this exemplary embodiment, description is made by taking the first-level nodes as the target nodes as an example. One comment container can be generated for each of the first-level nodes, that is, the number of the comment containers is the same as the number of the first-level nodes. Due to the large number of first-level nodes, the comment containers can be displayed on a plurality of pages. For example, it can be seen from FIG. 4 that the nodes corresponding to comment 1, comment 2 and comment 7 belong to the first-level nodes, the node corresponding to comment 5 belongs to the immediate child node of the first-level node of comment 1, the nodes corresponding to comments 3 and 4 belong to the immediate child nodes of the first-level node of comment 2, the node corresponding to comment 6 belongs to the immediate child node of the first-level node of comment 3, and the node corresponding to comment 8 belongs to the immediate child node of the first-level node of comment 4. For ease of description, the numbers for the nodes in the comment tree may be the same as those for the comments. Therefore, a comment container 501 can be generated for node 1, a comment container 502 can be generated for node 2 and a comment container 503 can be generated for node 7. It should be noted that a dimension and size of each comment container may be the same. In order to distinguish each of the comment containers, different comment containers may be identified by different colors, for example, a border or an entire area may be identified by different colors. Of course, it is also possible to not make identification, and there is no special limitation herein.

Figure 5:
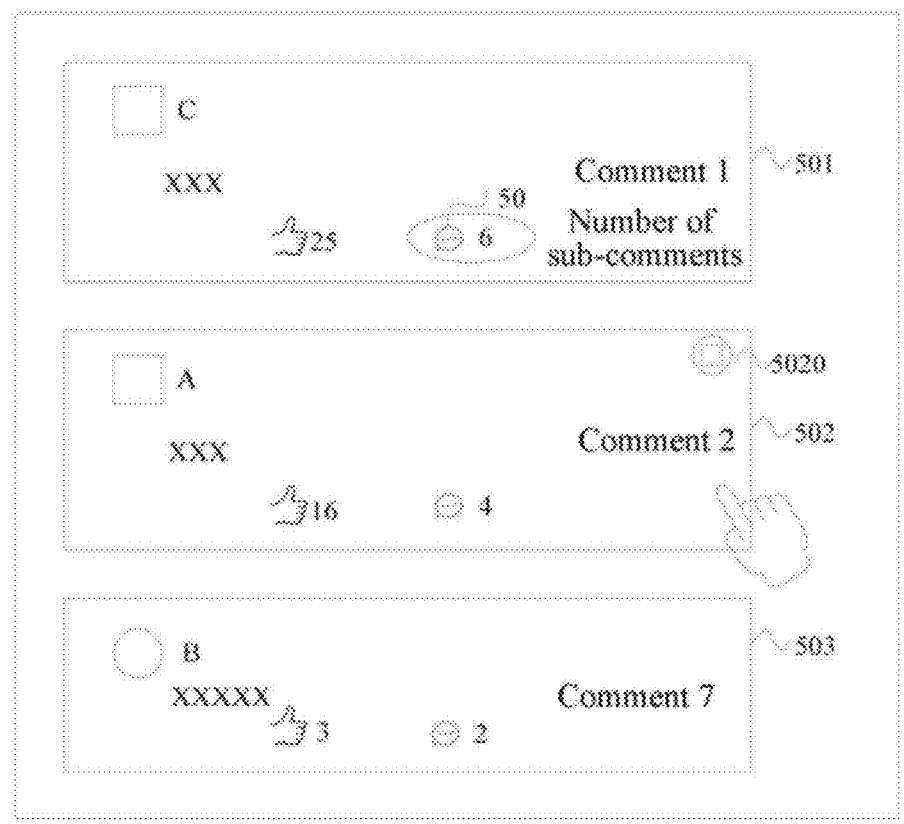
FIG. 5 schematically illustrates a schematic diagram of a comment container generated according to an exemplary embodiment of the present disclosure.

Each comment container may include the comment information of a parent node and all the child nodes corresponding to the parent node. The child nodes include immediate child nodes and non-immediate child nodes of the parent node. The parent node may include a superior node of a certain immediate child node which can be, for example, a first-level node or a parent node of a child node. Specifically, when generating the comment container, in an initial state of the comment container, only the comment information of the first-level nodes is displayed in the comment container, and the comment information of the child nodes of the first-level nodes is hidden, as shown in FIG. 5. Further, if a first touch event that controls the comment container of any target node to be unfolded is detected, the comment information of the target node and its immediate child nodes is presented in the controlled comment container. The first touch event may be, for example, a tap operation, a press operation, or a sliding operation that acts on the comment container, which is not particularly limited herein.

The controlled comment container refers to a comment container for which the first touch event has been received. For convenience of description, it can be referred to as a target comment container. In other words, the target comment container refers to the comment container selected by the user, that is, the first-level comment or popular comment which is interested in or required by the user, or the like. Specifically, the target comment container can be determined according to an area on which the tap operation by the user acts. For example, referring to FIG. 5, the user taps the comment container 501, and the comment container 501 is used as the target comment container. If the user taps the comment container 502, the comment container 502 is used as the target comment container.

After the target comment container is determined, the target nodes corresponding to the target comment container may be determined as the nodes for which the detailed comment information is to be presented. For example, as for the target comment container 502 where the comment 2 is located, the node 2 can be controlled to occupy the target comment container. It should be noted that, for each comment container, the comment information of the target node and the immediate child nodes thereof can be presented through the first touch event. In this way, it enables the user to focus on the comment information of the target node, avoiding the influence of irrelevant information, so that the user can quickly screen and obtain the comment information that he or she is interested in or requires through the first-level comments presented in the comment container, thereby performing effective screening in a large number of comments.

In this exemplary embodiment, the first touch event is mainly used for controlling the target comment container to unfold, so that the target comment container presents the sub-comment information of the first-level comment in addition to the first-level comment, thereby increasing the amount of presented comment information. The first touch event includes a tap operation acting on the target comment container or a tap operation acting on an unfolding control at a preset position of the target comment container. That is, if the tap operation acting on arbitrary position of the target comment container is detected, it can be considered that the first touch event is received. The arbitrary position can be, for example, a blank area or a text area of the target comment container. By using the first touch event in this manner, it is possible to avoid providing the control on the target comment container and thus avoid occlusion of the target comment container. In addition, an unfolding control can also be provided in the target comment container. For example, as shown in FIG. 5, the unfolding control 5020 can be provided at a preset position of the target comment container. The preset position can be an upper right corner, an upper left corner, or the like. The unfolding control can be provided after the target comment container is determined, or it can be provided when the comment container is generated. If the tap operation acting on the unfolding control is detected, it may be considered that the first touch event is received. By using the first touch event in this manner, it is possible to avoid false operating due to incorrect operation.

If the first touch event that controls the target comment container to be unfolded is detected, the comment information of the target node and the comment information corresponding to the immediate child nodes of the target node can be presented in the target comment container. The comment information of the immediate child nodes of the target node refers to the comment information directly replying to or commenting on the comment information of the target node, that is, the immediate sub-comments of the first-level comment.

Figure 6:
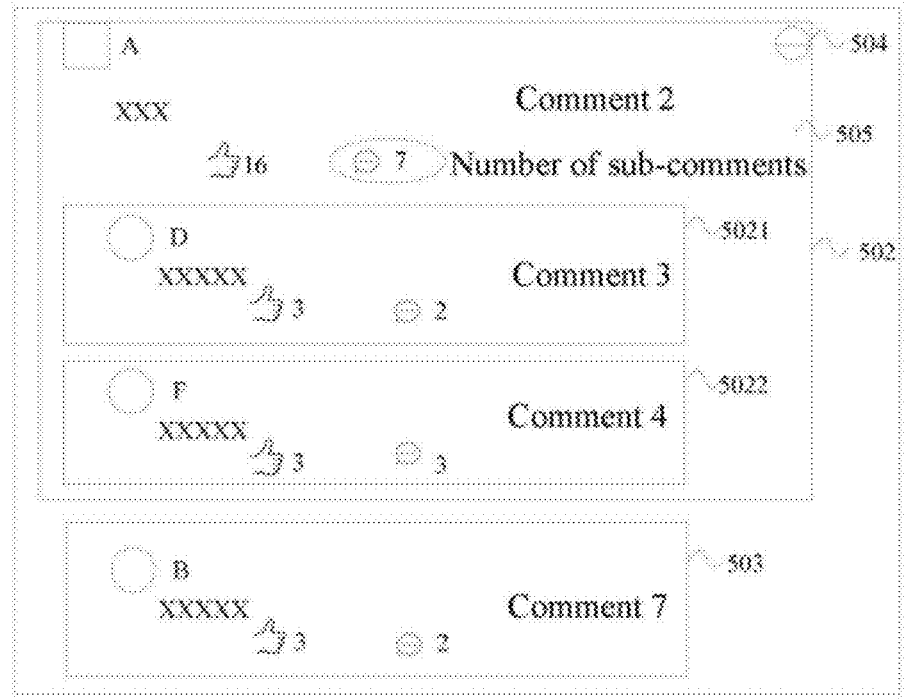
FIG. 6 schematically illustrates a schematic diagram of an operation interface for presenting comment information of immediate child nodes of a first-level node according to an exemplary embodiment of the present disclosure.

The specific steps for presenting the comment information corresponding to the immediate child nodes of the target node include: providing a preset area for the comment information corresponding to each immediate child node in the comment container, respectively, so as to separately present the comment information corresponding to each immediate child node of the target node through the preset area. Since each immediate child node may further include child nodes, in order to avoid mutual influence between a plurality of immediate child nodes, a preset area may be provided for the comment information to be presented which correspond to each immediate child node, respectively, so as to separately and independently present the comment information corresponding to each immediate child node through the preset area. For example, referring to FIG. 6, in the target comment container 502, a preset area can be generated for each of the immediate child nodes corresponding to comment 2, that is, a preset area 5021 is generated for the immediate child nodes corresponding to comment 3 and a preset area 5022 is generated for the immediate child nodes corresponding to comment 4. As such, the comment information corresponding to the node 3 can be independently presented through the preset area 5021, the comment information corresponding to the node 4 can be independently presented through the preset area 5022, and so on. If there is no immediate child node for the target node in the comment container, the comment information of the target node can still be presented in the comment container. If there are a plurality of immediate child nodes of the target node in the comment container, the comment information of each immediate child node can be presented below the comment container in chronological order according to the generation time of the comment information corresponding to the immediate child nodes. In this way, it enables the user to get the latest comment information.

Presenting the first-level comments through the comment container can function to guide the user. Only when the user is interested in a certain first-level comment, the user will pay attention to its follow-up replies, which also means that the attention for the follow-up replies tend to be less than that for the first-level comments. If the user expects his or her own comments to be seen, he or she will tend to post the first-level comment. As such, the user can be guided to express opinions with respect to the information rather than just commenting on other replies.

It should be noted that if the first touch event is received, only the comment information of the immediate child nodes of the target node can be displayed while the comment information of the target node is displayed in the comment container, and the comment information of the non-immediate child nodes cannot be displayed. That is, for the comment tree in FIG. 4, when the tap operation acting on the target comment container 502 is detected, comments 3 and 4 can be presented in the target comment container 502 through the preset areas, but comments 6 and 8 cannot be presented. In this way, the amount of the comment information browsed by the user is reduced, and the problem of display confusion caused by directly displaying all the comment information is avoided, which enables the user to quickly and easily acquire the comment quoted by a certain piece of comment information and the comments on a certain piece of comment information, and to quickly acquire the required comment information from the comment information corresponding to the immediate child nodes, thereby improving the efficiency and consistency in querying the comment information.

By presenting in the target comment container the comment information of the target node and the comment information corresponding to the immediate child nodes of the target node, the user only needs to focus on a current comment container without being interfered by other irrelevant comments if he or she desires to further explore the comment.

When presenting the comment information corresponding to each immediate child node of the target node, the method further includes: providing a close control for closing the comment container at a preset position of the comment container; and when a tap operation acting on the close control or a third touch event acting on a blank area in the comment container other than the preset area is detected, stopping the presenting of the comment information corresponding to the immediate child nodes of the parent node.

The close control is configured to fold or close the unfolded target comment container when the target comment container is not required or the comment information of the immediate child nodes is not required to be presented so as to fold the comments of the immediate child nodes and avoid occlusion of the interactive interfaces. Reference can be made to the close control 504 shown in FIG. 6. The close control can be provided at a preset position of the target comment container. For example, the preset position can be any appropriate position such as the upper-right corner or the upper-left corner of any comment container in which the sub-comment is unfolded, or the like, and herein, as an example, the upper-right corner is taken as the preset position for illustration. If the tap operation acting on the close control 504 is detected, the presenting of the comment information of the immediate child nodes of the parent node in the target comment container can be stopped, and the target comment container can be restored to the initial state. The initial state refers to a state in which only the comment information of the parent node is presented through the comment container.

In addition, the close control may not be provided at the preset position, and the presenting of the comment information of the immediate child nodes of the parent node in the target comment container can be stopped through the third touch event. The third touch event may act on the blank area in the comment container other than the preset area where the comment information of each immediate child node is located, such as the blank area 505 shown in FIG. 6. The third touch event may be, for example, a tap operation, a sliding operation, a press operation or the like acting on the blank area. That is to say, when the preset area 5021 is generated to present the comment 3 corresponding to the immediate child node 3 and the preset area 5022 is generated to present the comment 4 corresponding to the immediate child node 4, if the sliding operation acting on the blank area 505 is detected, the presenting of the comment information of the immediate child nodes 3 and 4 in the target comment container can be stopped.

In step S330, if a second touch event for the comment information corresponding to any immediate child node in any comment container is detected, the immediate child node on which the second touch event acts is changed into the parent node of the comment container where the immediate child node is located, and comment information corresponding to the changed parent node and the immediate child nodes of the changed parent node is presented in the comment container.

In this exemplary embodiment, after the comment information of the parent node and the comment information corresponding to the immediate child nodes of the parent node are presented in the comment container, the presented nodes may be changed. The specific steps include: if a second touch event for the comment information corresponding to any immediate child node in any comment container is detected, changing the immediate child node on which the second touch event acts into the parent node; and presenting the comment information corresponding to the changed parent node in the controlled target comment container, and presenting the comment information corresponding to the immediate child nodes of the changed parent node in the preset area of the target comment container.

If the user desires to view the reply or comment to the immediate child node, the user can further process the comment information corresponding to the immediate child node so as to present more comment information. One of the plurality of immediate child nodes selected by the user (i.e., the immediate child node on which the second touch event acts) may be used as a target immediate child node. Specifically, it may detect whether the second touch event is received in the preset area where the comment information corresponding to each immediate child node is located. For example, it may detect whether the second touch event is received in the preset area 5021 shown in FIG. 6. The second touch event may be, for example, a tap operation, and may act on the comment, a user name or an arbitrary position in the preset area 5021. If the second touch event is received, the target immediate child node may be changed into the parent node. For example, before the second touch event is received in the first area 5021, the parent node is the first-level node 2, and after the second touch event is received in the first area 5021, the parent node is changed into the immediate child node 3 of the first-level node 2 from the first-level node 2. For another example, before the second touch event is received, the parent node is the immediate child node 3, and after the second touch event is received, the parent node is changed from the immediate child node 3 into the immediate child node 6 of the node 3. At the same time, the target immediate child node can occupy the target comment container, that is, the target comment container uniquely corresponds to the target immediate child node. In this case, the superior node of the target immediate child node and the comment information corresponding to the superior node can be hidden, for example, the comment information of the first-level node 2 is hidden.

On this basis, the comment information of the immediate child nodes of the changed parent node can be independently displayed on the comment container. For example, referring to FIG. 6, when the tap operation on the preset area 5021 is received, the immediate child node 3 is used as the parent node of the target comment container 502, and the comment 3 corresponding to the immediate child node 3 is presented in the target comment container 502. Referring again to FIG. 7, the comment information corresponding to the immediate child node 6 of the node 3, i.e., the comment 6, is independently presented through the preset area 5023.

Further, if the user taps the preset area where the comment 6 corresponding to the immediate child node 6 is located, the immediate child node 6 is changed to the parent node, and the comment information of the node 6 and the comment information of the immediate child node of the node 6 are presented in the target comment container. Either before or after the immediate child node is tapped, the comment information of any immediate child node can be independently presented through the preset area. In this way, it enables the user to quickly see the comment information of the immediate child nodes of each parent node. The user only needs to focus on the comment information of the parent node of the current comment container without being disturbed by other irrelevant comments if he or she desires to further explore a certain comment.

When the comment information of the immediate child nodes of the changed parent node is displayed, the method further includes: providing, at a preset position of the comment container, a switching control for returning to a superior node of the changed parent node; and switching the comment information corresponding to the changed target node presented in the comment container to the comment information corresponding to the superior node of the changed parent node if a tap operation acting on the switching control is detected. In order to facilitate the user to view the comment information of the superior node of the immediate child node, the switching control may be provided at the preset position of the target comment container, and the preset position may still be the upper right corner or the upper left corner of the comment container, or the like. The switching control is configured to return to the comment information of the superior node of the changed parent node, such as the switching control 506 shown in FIG. 7. If the tap operation acting on the switching control is detected, the comment information corresponding to the changed parent node presented in the comment container is switched to the comment information corresponding to the superior node of the changed parent node, and the comment information corresponding to the changed immediate child nodes presented in the comment container is switched to the comment information corresponding to the superior node of the changed immediate child nodes.

Figure 7:
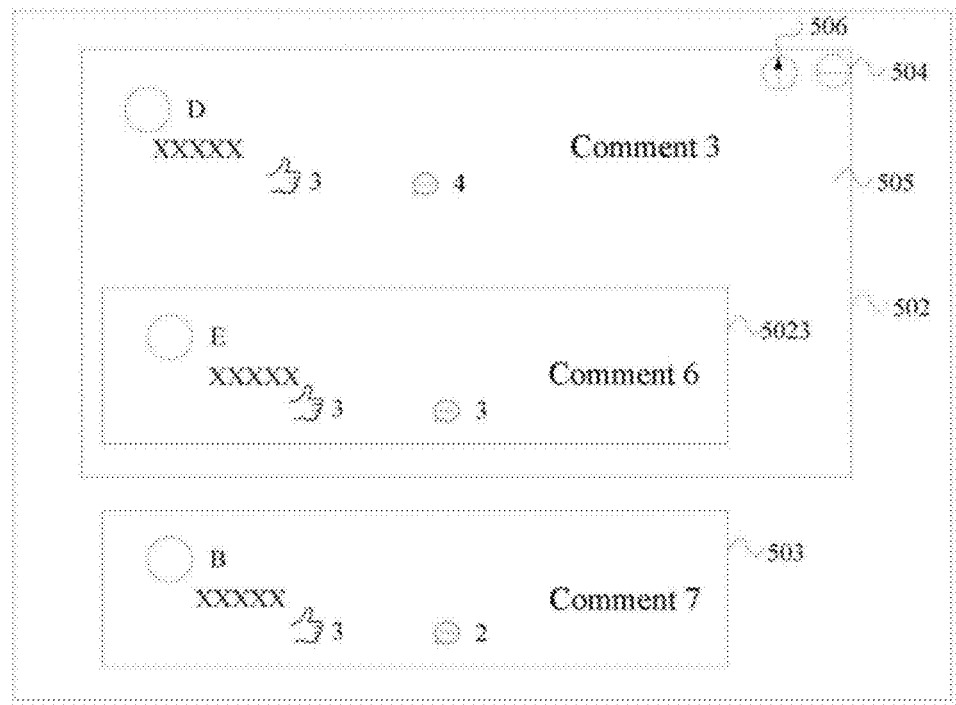
FIG. 7 schematically illustrates a schematic diagram of an operation interface for presenting comment information of immediate child nodes of an immediate child node according to an exemplary embodiment of the present disclosure.

For example, referring to FIG. 7, if the parent node is the immediate child node 3 and the tap operation acting on the switching control 506 is detected, the comment information of the immediate child node 3 presented in the controlled target comment container is changed to the comment 2 of the first-level node 2 which is the superior node of the immediate child node 3. While switching, the comment information of the node 6 presented in the preset area is switched to the comment information of the node 3 and the node 4. In the process of switching the comment information, the gradient effect of switching left and right or switching up and down can be displayed to improve the user experience.

In addition, since some users are accustomed to displaying all comment information, in this example, a layout control for switching arrangement of the comment information in the comment container may be provided at a preset position of the comment container. The preset position can still be the upper-right corner or the upper-left corner of the comment container, or the like. With the layout control, the arrangement of the comment information can be switched between presenting only the comment information of the immediate child nodes of the parent node and presenting the comment information of all the child nodes of the current comment so as to suit the users' habits.

It should be noted that the preset positions in this exemplary embodiment may be the same position, that is, the preset positions may be the upper right corner or the upper left corner of the comment container, or the like. In this case, a plurality of controls at the preset position can be arranged in parallel horizontally or vertically, or in a certain order. Of course, the preset positions can also be different positions. For example, the unfolding control, the close control, the switching control, and the layout control are provided at different positions. They can be set according to actual requirements, and are not particularly limited herein.

After acquiring the comment information, the user can directly comment by tapping the comment control in any comment container. For example, the user makes the comment on the comment 1 corresponding to the first-level node 1 by tapping the comment control 50 shown in FIG. 5. It should be noted that, for any comment container, for example, each controlled comment container, the process of presenting the comment information is the same as the above process, and will not be repeated here.

In addition, the entire process is described with respect to a popular node which is the target node. The popular node refers to a node with a large number of likes, and the popular node includes, but is not limited to, the node with a large number of likes in the first-level nodes. When the target node is the popular node, a comment container may be generated for each popular node, and each comment container includes the comment information of each popular node and the immediate child nodes of the popular node. When the comment container is generated, the comment information of each popular node is first presented in each comment container. If the tap operation for controlling the unfolding of the comment container acting on a certain comment container is detected, and there is the immediate child node(s) of the popular node corresponding to the comment container, the comment information of each immediate child node of the popular node is independently presented in the comment container through a plurality of preset areas. If a tap operation acting on the preset area of a certain immediate child node is further received, the immediate child node is reused as the parent node to occupy the comment container where it is located. If a tap operation acting on the switching control for returning to a superior node of the changed parent node is received, the comment information of the changed parent node presented in the comment container is switched to the comment information of the superior node of the changed parent node. It is to be noted that when there are a plurality of popular nodes (nodes M, N) under a first-level node such as a node X, a comment container is first generated for each of the popular nodes so as to present the popular comments in the comment containers. If the operation for returning to the superior node is detected, the comment information of the parent node (node X) is presented in the comment container corresponding to each popular node. By presenting the popular comment and the comment information of the immediate child nodes thereof through the comment container, it is convenient for the user to directly and quickly view the popular comments, and filter out the comment information that is not the popular comments, thereby improving the user experience.

In the method for processing comment information according to the embodiment of the present disclosure, in one aspect, the comment container is generated for each target node and the comment information corresponding to any parent node and its immediate child nodes is presented in the comment container, which avoids the problem of display confusion caused by directly displaying all comment information, enables the user to quickly and easily acquire the comment quoted by certain comment information and the comments to the certain comment information, and improves the efficiency and consistency in querying the comment information. In another aspect, the comment container is generated for the target node in the comment tree, which enables the user to quickly filter and screen the comment information through the comment container corresponding to the target comment, without being affected by irrelevant comment information, and improves the accuracy of getting the effective comment information. In still another aspect, through the second touch event acting on the comment information corresponding to any immediate child node in any comment container, the immediate child node is changed to the parent node, and the comment information corresponding to the changed parent node and its immediate child nodes is presented in the comment container, which enables the user to directly view the comment information of the immediate child node and immediate child nodes of the immediate child node, which is convenient for the user to view and filter the irrelevant comment information, and improves the user experience.

Figure 8:
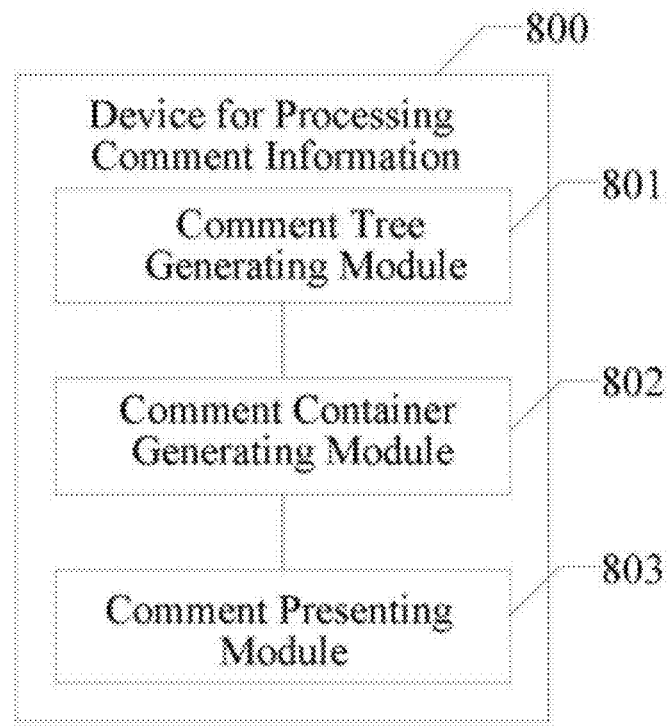
FIG. 8 schematically illustrates a block diagram of a device for processing comment information according to an exemplary embodiment of the present disclosure.

The embodiments of the present disclosure also provide a device for processing comment information. Referring to FIG. 8, the device 800 for processing comment information may include:

a comment tree generating module 801 configured to acquire a plurality of pieces of comment information, and generate a comment tree including a plurality of nodes according to an association relationship between the plurality of pieces of comment information, wherein the plurality of nodes of the comment tree correspond to the plurality of pieces of comment information on a one-to one basis;

a comment container generating module 802 configured to generate a comment container for each target node in the plurality of nodes, wherein the comment container is used for presenting the comment information corresponding to any parent node and immediate child nodes of the parent node; and a comment presenting module 803 configured to change, when a second touch event for the comment information corresponding to any immediate child node in any comment container is detected, the immediate child node on which the second touch event acts into the parent node of the comment container where the immediate child node is located, and present the comment information corresponding to the changed parent node and the immediate child nodes of the changed parent node in the comment container.

Details regarding the exemplary embodiments of the device for processing comment information have been described above with respect to the method embodiments, which will not be repeated here.

It should be noted that although several modules or units of the device for performing actions are described above, such division is not mandatory. In fact, according to the embodiments of the present disclosure, the features and functions of two or more modules or units described above may be embodied in one module or unit. Conversely, the features and functions of one module or unit described above can be further divided and embodied by a plurality of modules or units.

Furthermore, although various steps of the methods of the present disclosure are described in a particular order in the drawings, it does not require or imply that the steps must be performed in that particular order or that all of the steps shown must be performed to achieve a desired result. Additionally or alternatively, certain steps may be omitted, multiple steps may be combined into one step, one step may be divided into a plurality of steps, and so on.

In an exemplary embodiment of the present disclosure, there is also provided an electronic device capable of carrying out the above method.

Those skilled in the art can understand that various aspects of the present disclosure may be implemented as a system, method, or program product. Therefore, various aspects of the present disclosure can be embodied in the forms of a complete hardware implementation, a complete software implementation (including firmware, microcode, etc.), or a combination of hardware and software aspects, which can be collectively referred to as a "circuit", "module", or "system".

An electronic device 900 according to an exemplary embodiment of the present disclosure is described below with reference to FIG. 9. The electronic device 900 shown in FIG. 9 is only an example, and should not impose any limitation on the functions and usage scope of the embodiments of the present disclosure.

Figure 9:
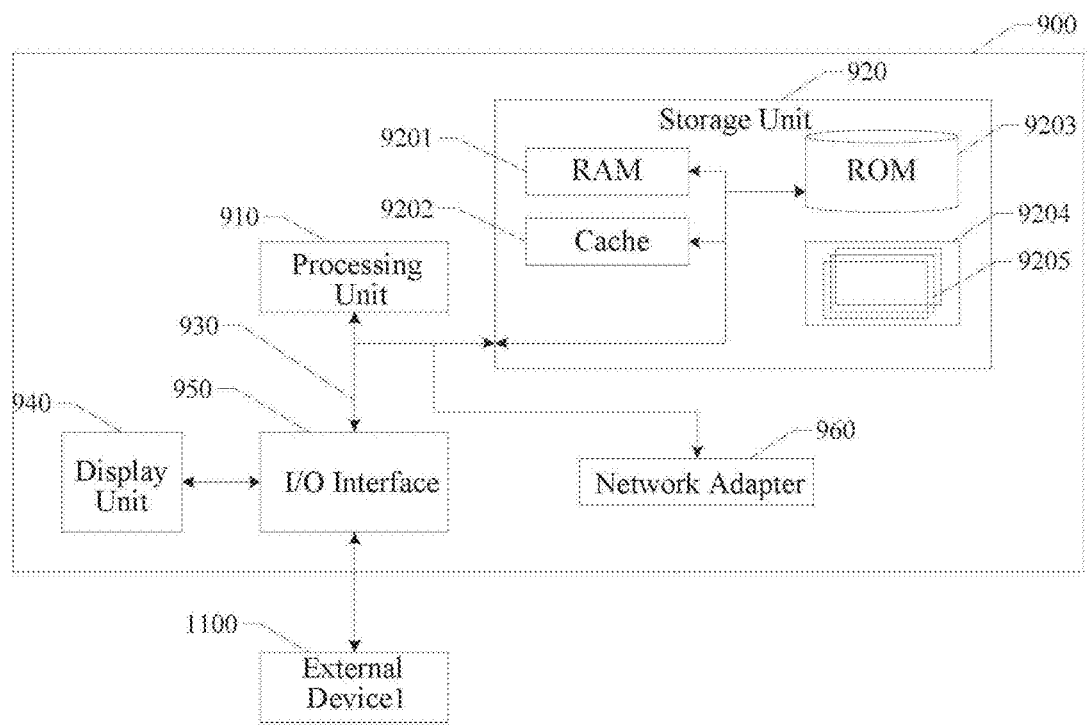
FIG. 9 schematically illustrates an electronic device for implementing the above method for processing comment information.

As shown in FIG. 9, the electronic device 900 is shown in the form of a general-purpose computing device. The components of the electronic device 900 may include, but are not limited to, at least one processing unit 910, at least one storage unit 920, and a bus 930 connecting different system components (including the storage unit 920 and the processing unit 910).

The storage unit stores program codes which can be executed by the processing unit 910 to cause the processing unit 910 to perform steps according to various exemplary embodiments of the present disclosure as described in the exemplary method section of the description. For example, the processing unit 910 may perform the steps shown in FIG. 3.

The storage unit 920 may include a readable medium in the form of a volatile storage unit, such as a random access memory (RAM) unit 9201 and/or a cache storage unit 9202, and may further include a read-only memory (ROM) unit 9203.

The storage unit 920 may further include a program/utility tool 9204 having a set of program modules (at least one program module) 9205. Such program modules 9205 include, but are not limited to, an operating system, one or more applications, other program modules, and program data, each or some combination of which may include an implementation of a network environment.

The bus 930 may be one or more of several types of bus structures, including a storage unit bus or a storage unit controller, a peripheral bus, a graphics acceleration port, a processing unit, or a local area bus employing any bus structure in a variety of bus structures.

The display unit 940 may be a display with a display function to display through the display the processing results obtained by performing the methods according to the exemplary embodiments by the processing unit 910. The display includes, but is not limited to, a liquid crystal display or other displays.

The electronic device 900 may also communicate with one or more external devices 1100 such as a keyboard, a pointing device, a Bluetooth device, etc., may also communicate with one or more devices that enable the user to interact with the electronic device 900, and/or may also communicate with any device, such as a router, a modem or the like that enables the electronic device 900 to communicate with one or more other computing devices. Such communication can be performed through an input/output (I/O) interface 950. Moreover, the electronic device 900 may communicate with one or more networks such as a local area network (LAN), a wide area network (WAN), and/or a public network, for example, an Internet through a network adapter 960. As shown, the network adapter 960 communicates with other modules of the electronic device 900 through the bus 930. It should be understood that although not shown in the figure, other hardware and/or software modules may be used in conjunction with the electronic device 900, which include, but are not limited to, microcode, device drivers, redundant processing units, external disk drive arrays, RAID systems, tape drives, data backup storage systems and so on.

Through the description of the foregoing embodiments, those skilled in the art can easily understand that the exemplary embodiments described herein can be implemented by software, or by software in combination with necessary hardware. Therefore, the technical solutions according to the embodiments of the present disclosure may be embodied in the form of a software product which can be stored in a non-volatile storage medium which may be a CD-ROM, a U disk, a mobile hard disk, etc., or on a network. The software product may include instructions to cause a computing device which may be a personal computer, a server, a terminal device, a network device or the like to perform the methods according to exemplary embodiments of the present disclosure.

An exemplary embodiment of the present disclosure also provides a computer-readable storage medium having stored thereon a program product capable of implementing the above methods according to the embodiments of the present disclosure. In some possible implementations, aspects of the present disclosure may also be implemented in the form of a program product including program codes which, when running on a terminal device, cause the terminal device to perform the steps according to various exemplary embodiments of the present disclosure as described in the above exemplary method section of the description.

Figure 10:
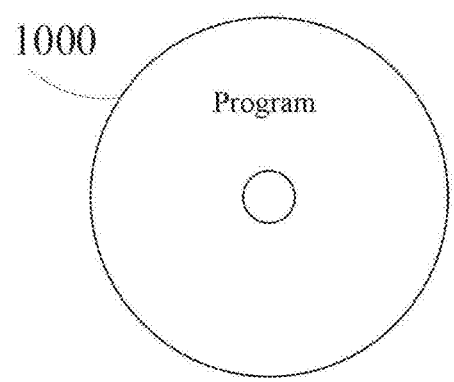
FIG. 10 schematically illustrates a computer-readable storage medium for implementing the above method for processing comment information.

Referring to FIG. 10, a program product 1000 for implementing the above method according to an exemplary embodiment of the present disclosure is shown. The program product 1000 may adopt a portable compact disc read-only memory (CD-ROM) and include program codes, and may be run on a terminal device such as a personal computer. However, the program product of the present disclosure is not limited thereto. The readable storage medium may be any tangible medium containing or storing a program which can be used by or used in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (a non-exhaustive list) of the readable storage medium include an electrical connection with one or more wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The computer-readable signal medium may include a data signal in a baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by or used in combination with an instruction execution system, apparatus, or device.

The program codes contained on the readable medium may be transmitted using any appropriate medium, including but not limited to wireless, wired, optical fiber, RF, etc., or any suitable combination of the foregoing.

The program codes for performing the operations of the present disclosure can be written in one programming language or any combination of programming languages, which include object-oriented programming language, such as Java, C++, and so on, and also include conventional procedural programming language, such as "C" language or a similar programming language. The program codes can be executed entirely on a user computing device, executed partly on the user device, executed as an independent software package, executed partly on the user computing device and partly on a remote computing device, or executed entirely on the remote computing device or a server. In the case of the remote computing device, the remote computing device can be connected to the user computing device via any type of network, including a local area network (LAN) or a wide area network (WAN), or the remote computing device can be connected to an external computing device, for example, using the Internet provided by the Internet service providers.

In addition, the drawings are merely schematic illustrations of processes included in the methods according to exemplary embodiments of the present disclosure, and are not intended to limit the present disclosure. It can be easily understand that the processes shown in the drawings do not indicate or limit the chronological order of these processes. In addition, it can also be easily understand that these processes may be performed synchronously or asynchronously in a plurality of modules, for example.

Those skilled in the art will readily contemplate other embodiments of the present disclosure in consideration of the description and practicing the disclosure. The present disclosure intends to cover any variation, use, or adaptive change of the present disclosure which follows general principles of the present disclosure and includes the common knowledge or conventional technical means in the art which is not described herein. The specification and examples should be considered as exemplary only, and the true scope and spirit of the present disclosure should be defined by the appended claims.

What is claimed is:

1. A method for processing comment information, comprising:

acquiring a plurality of pieces of comment information, and generating a comment tree comprising a plurality of nodes according to an association relationship between the plurality of pieces of comment information, wherein the plurality of nodes of the comment tree correspond to the plurality of pieces of comment information on a one-to-one basis;

generating a comment container for each target node in the plurality of nodes, wherein a first comment container corresponding to a target node presents the comment information corresponding to the target node, and the target node is the parent node corresponding to the first comment container;

presenting, once a first event that controls the first comment container of the target node to be unfolded is detected, the comment information of the target node and the immediate child nodes of the target node in the controlled first comment container;

and changing, once a second event for the comment information corresponding to an immediate child node among the one or more immediate child nodes in the first comment container is detected, the first comment container into a second comment container, wherein the second event is acted on the immediate child node, the immediate child node on which the second event acts is a parent node of the second comment container, and the second comment container presents the comment information corresponding to the parent node and immediate child nodes thereof.

2. The method according to claim 1, wherein the association relationship comprises a subordinate relationship between the plurality of pieces of comment information, and the generating the comment tree comprising the plurality of nodes according to the association relationship between the plurality of pieces of comment information comprises:

determining a parent-child relationship between the plurality of nodes according to the subordinate relationship between the plurality of pieces of comment information;

and generating the comment tree according to the parent-child relationship between the plurality of nodes.

3. The method according to claim 1, wherein the target node comprises a first-level node or a popular node.

4. The method according to claim 1, wherein the first event comprises a tap operation acting on an arbitrary position of the comment container or a tap operation acting on an unfolding control at a preset position of the comment container.

5. The method according to claim 1, further comprising:

providing a preset area for the comment information corresponding to each immediate child node in each comment container, so as to separately present the comment information corresponding to each immediate child node of the parent node through the preset area.

6. The method according to claim 5, wherein after separately presenting the comment information corresponding to each immediate child node of the parent node through the preset area, the method further comprises:

stopping, once a tap operation acting on a close control at a preset position in the comment container or a third event acting on a blank area other than the preset area in the comment container is detected, presenting the comment information corresponding to the immediate child nodes of the parent node in the comment container.

7. The method according to claim 1, further comprising:

providing at a preset position of the second comment container a switching control for returning to a superior node of the parent node of the second comment container;

and once a tap operation acting on the switching control is detected, switching from the second comment container to the first comment container.

8. The method according to claim 1, further comprising:

providing in the comment container a layout control for switching arrangement of the comment information in the comment container.

9. A non-transitory computer-readable storage medium having stored thereon a computer program which, when being executed by a processor, causes the processor to perform operations comprising:

acquiring a plurality of pieces of comment information, and generating a comment tree comprising a plurality of nodes according to an association relationship between the plurality of pieces of comment information, wherein the plurality of nodes of the comment tree correspond to the plurality of pieces of comment information on a one-to-one basis;

generating a comment container for each target node in the plurality of nodes, wherein a first comment container corresponding to a target node presents the comment information corresponding to the target node, and the target node is the parent node corresponding to the first comment container presenting, once a first event that controls the first comment container of the target node to be unfolded is detected, the comment information of the target node and the immediate child nodes of the target node in the controlled first comment container;

and changing, once a second event for the comment information corresponding to an immediate child node of the one or more immediate child nodes in the first comment container is detected, the first comment container into a second comment container, wherein the second event is acted on the immediate child node, the immediate child node on which the second event acts is a parent node of the second comment container, and the second comment container presents the comment information corresponding to the parent node and immediate child nodes thereof.

10. An electronic device comprising:

a processor;

and a memory for storing instructions executable by the processor, wherein, the processor is configured to execute the executable instructions to:

acquire a plurality of pieces of comment information, and generating a comment tree comprising a plurality of nodes according to an association relationship between the plurality of pieces of comment information, wherein the plurality of nodes of the comment tree correspond to the plurality of pieces of comment information on a one-to-one basis;

generate a comment container for each target node in the plurality of nodes, wherein a first comment container corresponding to a target node presents the comment information corresponding to the target node, and the target node is the parent node corresponding to the first comment container present, once a first event that controls the first comment container of the target node to be unfolded is detected, the comment information of the target node and the immediate child nodes of the target node in the controlled first comment container; and change, once a second event for the comment information corresponding to an immediate child node of the one or more immediate child nodes in the first comment container is detected, the first comment container into a second comment container, wherein the second event is acted on the immediate child node, the immediate child node on which the second event acts is a parent node of the second comment container, and the second comment container presents the comment information corresponding to the parent node and immediate child nodes thereof.

11. The electronic device according to claim 10, wherein the association relationship comprises a subordinate relationship between the plurality of pieces of comment information, and the processor is further configured to:
determine a parent-child relationship between the plurality of nodes according to the subordinate relationship between the plurality of pieces of comment information;
and generate the comment tree according to the parent-child relationship between the plurality of nodes.

12. The electronic device according to claim 10, wherein the target node comprises a first-level node or a popular node.

13. The electronic device according to claim 10, wherein the first event comprises a tap operation acting on an arbitrary position of the comment container or a tap operation acting on an unfolding control at a preset position of the comment container.

14. The electronic device according to claim 10, wherein the processor is further configured to:
provide a preset area for the comment information corresponding to each immediate child node in each comment container, so as to separately present the comment information corresponding to each immediate child node of the parent node through the preset area.

15. The electronic device according to claim 14, wherein after separately presenting the comment information corresponding to each immediate child node of the parent node through the preset area, the processor is further configured to:
stop, once a tap operation acting on a close control at a preset position in the comment container or a third event acting on a blank area other than the preset area in the comment container is detected, presenting the comment information corresponding to the immediate child nodes of the parent node in the comment container.

16. The electronic device according to claim 10, the processor is further configured to:
provide at a preset position of the second comment container a switching control for returning to a superior node of the parent node of the second comment container;
and once a tap operation acting on the switching control is detected, switch from the second comment container to the first comment container.

17. The electronic device according to claim 10, the processor is further configured to:
provide in the comment container a layout control for switching arrangement of the comment information in the comment container.

\* \* \* \* \*